United States Patent [19]

Giers et al.

[11] 4,424,711

[45] Jan. 10, 1984

[54] PROCESS AND APPARATUS FOR ADJUSTING A BALANCING MACHINE

[75] Inventors: Alfred Giers, Roodorf; Paul Holdinghausen, Bickenbach, both of Fed. Rep. of Germany

[73] Assignee: Carl Schenck AG, Fed. Rep. of Germany

[21] Appl. No.: 316,121

[22] Filed: Oct. 29, 1981

[30] Foreign Application Priority Data

Oct. 29, 1980 [DE] Fed. Rep. of Germany ....... 3040713

[51] Int. Cl.³ .............................................. G01M 1/16
[52] U.S. Cl. ........................................ 73/462; 73/1 B
[58] Field of Search ......................... 73/462, 465, 1 B; 364/463

[56] References Cited

U.S. PATENT DOCUMENTS

| | | | |
|---|---|---|---|
| 3,232,118 | 2/1966 | Hack | 73/462 |
| 3,608,381 | 9/1971 | Hines | 73/462 |
| 3,661,016 | 5/1972 | Dopp | 73/462 |
| 4,064,704 | 12/1977 | Blackburn | 73/462 |

Primary Examiner—James J. Gill
Attorney, Agent, or Firm—Connolly and Hutz

[57] ABSTRACT

A balancing machine is used to measure the unbalance of a rotor by obtaining a first reading representative of the vector sum of the unbalance of the rotor and an amount comprising the product of the mass of the rotor and its eccentricity relative to the axis of the balancing machine. A second reading is obtained after shifting the rotor 180° relative to the balancing machine while maintaining the same eccentricity, and the second reading is then subtracted from the first to obtain a final reading representative of the true unbalance of the rotor without influence of its eccentricity relative to the balancing machine. The final reading is used to effect a true balance of the rotor, and an arrangement is provided to accomplish such balance.

3 Claims, 3 Drawing Figures

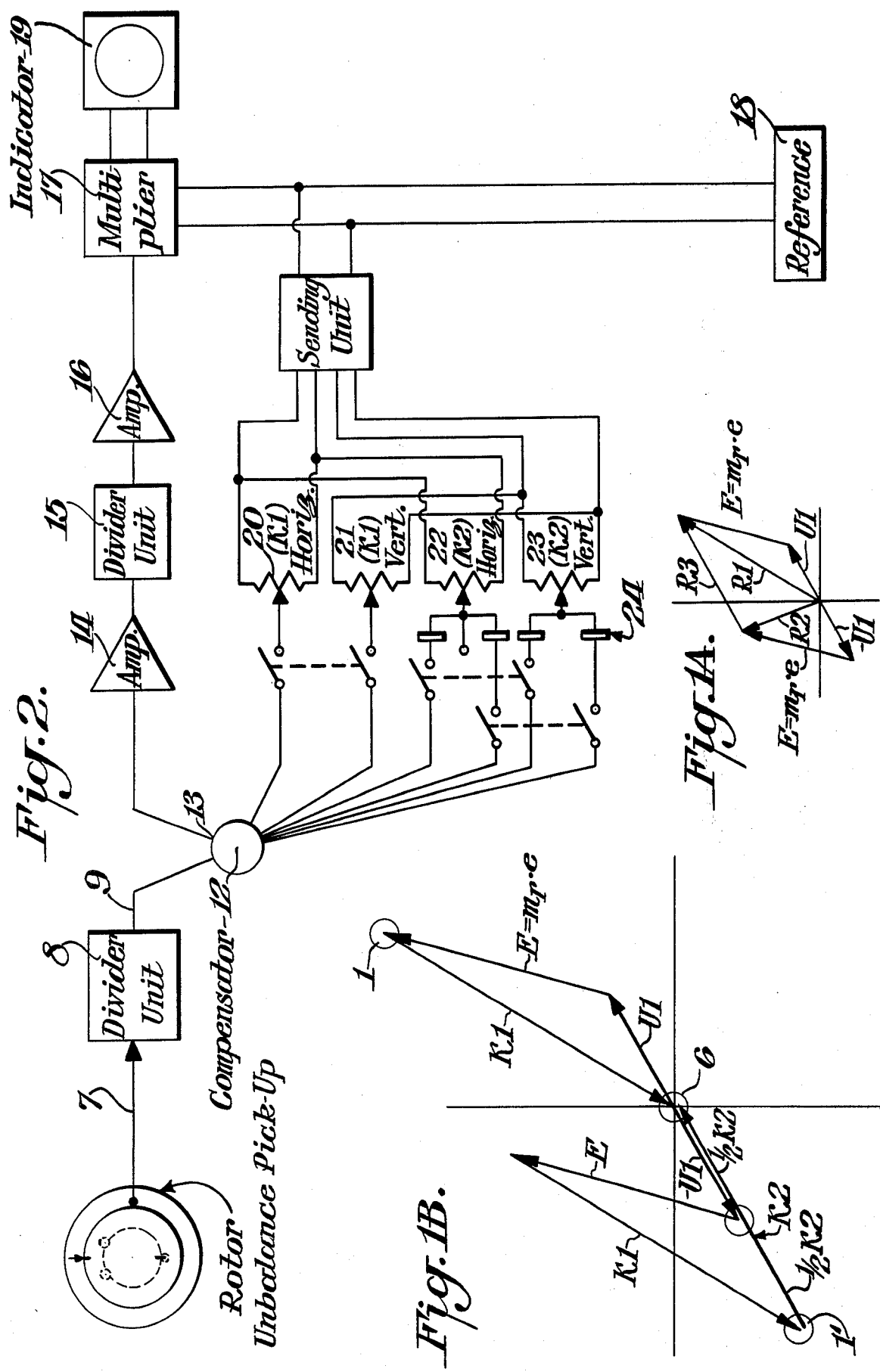

PROCESS AND APPARATUS FOR ADJUSTING A BALANCING MACHINE

BACKGROUND OF THE INVENTION

The invention relates to a process and a device for adjusting a machine for balancing rotors.

Numerous tasks arise in balancing technology in which it is desirable to superimpose another electrical signal upon the test signal of the receiver of a balancing machine. For example, the empirical calibration of a balancing machine is facilitated if the first rotor must not be balanced by testing according to its type but rather by apparently balancing an unbalanced rotor by superimposing a voltage over the test signal and thereby obtaining a calibration rotor.

Moreover, the task often arises that rotors are to be balanced whose ultimate shaft axis is not defined because they are later combined with another shaft, for example. It is then necessary to work with an auxiliary shaft or to define the shaft axis in some other suitable manner.

Errors arise precisely in the last-mentioned task if the shaft axis of the balancing machine is not exactly concentric with the axis of the part to be balanced. Such a systematic error is eliminated in a known way by superimposing electric voltages over the test signal (DE-AS No. 12 78 140). Such an electrical compensation of the test magnitude part not coming from the rotor unbalance can only be economically introduced if the signal produced by the pick-up is proportional in a large rotor weight range of the displacement of the center of gravity (soft bearing machines).

If, however, the signal released by the pick-ups is directly in proportion to the unbalance, as in the case of so-called hard bearing machines, the difficulty arises of producing a compensation voltage which on the one hand is great enough to compensate for the largest signals but on the other hand must possess such a fine resolution that the compensation can be followed sufficiently precisely even with the lightest rotor. If a balancing machine is designed for a greater weight range, compensation voltage ratios of about 1:30,000 to 1:100,000 appear in practice.

Now in order to be able to use hard bearing machines, which are substantially simpler to design and are sturdier and in this way offer considerable advantages to the operator in the range mentioned at the outset as well, the invention's task was that of making a process free from problems available by the design of the magnitude of the receiver signals conditioned by the balancing machine. This task is solved in accordance with the invention in that, in the case of hard bearing balancing machines before processing the receiver signals, which in addition to the unbalance value includes an amount which is independent of the unbalance. One such amount may be caused by the distance between the rotor shaft and the rotational shaft of the balancing machine (eccentricity), while another amount may be the result of some mass influencing the receiver signals. These parameters are made inactive for the subsequent processing.

SUMMARY OF THE INVENTION

The object which is the basis of the invention is solved in a surprisingly simple way by the fact that the receiver signals are weakened as a rotor weight given parameter before compensation.

It is proposed in the development of the process in accordance with the invention that the influence of the parameter which has been made inactive be taken into consideration in the assessment of the test signal. This can be achieved by displacing the meter value corresponding to the weakening.

A device for the execution of the process in accordance with the invention with a unit processing the receiver signals is characterized by the fact that the receiver signals are sent to a circuit whose amplification factor is inversely proportional to at least one given parameter. The receiver signals thus altered are conducted to a compensation device by means of which the influence of the eccentricity in the signals is eliminated. This electrical switching device accordingly makes a compensation of the test results possible, independently of the compensation voltage condition, given at the outset as from 1:30,000 to 1:100,000.

It is proposed in the designing of this device for an arrangement taking the influence of the amplification factor into consideration to be provided after the compensation unit. It is proposed in another design of the object of the invention for the amplification factor to be regulated in steps.

BRIEF DESCRIPTION OF THE DRAWING

Novel features and advantages of the present invention in addition to those mentioned above will become apparent to those skilled in the art from a reading of the following detailed description in conjunction with the accompanying drawing wherein:

FIG. 1A is a vector diagram of unbalance factors;

FIG. 1B is a vector diagram in which the factors of eccentricity and weight influencing the unbalance of a rotor are compensated; and FIG. 2 is a schematic block diagram of an electrical circuit for compensating the factors influencing the unbalance of a rotor and providing an indication of the unbalance value.

DETAILED DESCRIPTION OF THE INVENTION

As background, if there exists an eccentricity e between the location of the rotor being balanced and the shaft axis of the balancing machine, then it is not possible to carry out perfect balancing of the rotor on this machine without further measures. For example, the vector diagram of FIG. 1A illustrates an unbalance U1 in the rotor being balanced. The vector parameter E represents an amount composed of the product of the mass of the rotor and the eccentricity e between the location of the rotor and the shaft axis of the balancing machine. Vector R1 is the sum of unbalance U1 and the parameter E. Next, if the rotor is turned 180° relative to the balancing machine with maintenance of the same eccentricity e between the location of the rotor and the shaft axis of the balancing machine, a resultant vector R2 results from the addition of an unbalance-U1 and the same parameter E. Subtraction of vector R2 from the vector R1 produces the vector R3. As is readily apparent from FIG. 1A, one half of the vector R3 represents the unbalance U1. This information is but one example of the vector parameter E, it being understood that such parameter E may result from other factors, such as the measurement of one stage of a multistage turbine and other instances where the ultimate shaft axis of the rotor being balanced is not defined because of later combination with another shaft. The parameter E would then be representative of such conditions.

In FIG. 1B the unbalance U1 acting in the direction shown in the plane of the rotor being balanced is superimposed in a certain direction by the parameter E. As described above, parameter E comprises the product of the mass of the rotating body and its eccentricity. If the result of these two forces is shown on a vectormeter, signal 1 appearing on the vectormeter does not correspond to the actual unbalance U1. In order to shift this signal 1 to the origin 6 of the coordinate system, a first compensation voltage K1 is used. In order to now eliminate the influence of the parameter E, the rotor is turned 180° relative to the mounting of the balancing machine while maintaining the same eccentric position and the rotor is again fixed to the machine. An equal vector diagram consisting of U1, E and K1, displaced by-2U1 in comparison with the vector diagram, results, where now signal 1' corresponds to signal 1 without a 180° rotation of the rotor.

Signal 1', which is indicated on the vectormeter, is now entered in origin 6 of the coordinate system by means of a second compensation voltage K2. The actual magnitude of unbalance U1, freed from parameter E and freed from eccentricity, is now necessarily equal to half the second compensation voltage K2.

The process explained in FIGS. 1A and B in vector diagram form is schematically shown in FIG. 2 in a schematic block diagram. The unbalance information from an unbalance pick-up arranged on a hard bearing balancing machine, for example, is transmitted over line 7. Such information includes the voltage portion which results from the mass of the rotor and its eccentricity, which is given as a fixed parameter E as a function of the mass. This influence is affected in divider unit 8, in which the voltage value coming on line 7 is multiplied by the reciprocal value of the mass of the rotor. This multiplication is advantageously conducted with the reciprocal value of the mass of the rotor in steps. Instead of the multiplication with weights in ranges, for example, a first range of 0 to 3, 3 to 5, and 5 to 10 kg, it is also possible to carry a multiplication with a continuous reciprocal voltage value corresponding to the actual weight of the rotor.

The complete voltage, consisting of the unbalance U1 and parameter E comes to the voltage divider 8 which divides the voltage in discreet steps not in a continuous manner as a potentiometer. As noted above, step one runs from 0 to 3 kg, step two from 3 to 5 kg and so on. The measuring unit has for this purpose pushbuttons or the like where the pushbutton in the range 5 to 10 kg is pressed down when a rotating body has a weight in this range.

The voltage appearing at the outlet at line 9 is conducted to a compensation device 12, to which both compensation voltage K1 (compare FIG. 1) and compensation voltage K2 or ½ K2 are conducted, so that an unbalance voltage free from eccentricity is conducted to amplifier 14 from outlet 13 of compensation device 12. The multiplication by the reciprocal value of the mass achieved in the divider unit 8 is taken into consideration in this amplifier 14 by multiplying the unbalance voltage by the value of the mass of the rotor. The unbalance voltage prepared in this way is conducted to unit 15 in which the radius of the unbalance is taken into consideration by dividing the voltage by that radius, and then through amplifier 16 of multiplication device 17, to which at the same time the corresponding information for the unbalance angle position from reference 18 is passed. Reference 18 may comprise a phase-generator, for example, for determining the angle of the unbalance. Signal device or indicator 19 connected after the multiplication device is a vectormeter or a digital signal device for indicating the unbalance in the rotor body to be balanced according to size and angle.

Potentiometers 20,21 provide the horizontal and vertical components of the first compensation voltage K1, and the other potentiometers 22,23 provide the horizontal and vertical components of the second compensation voltage K2.

By way of further explanation, the compensator 12 is that point in which the voltage from line 9 is combined with the vertical and horizontal components of the compensation voltage K1. Numeral 20 is for instance the horizontal component and numeral 21 the vertical component of the compensation voltage K1. Further, the horizontal component of the compensation voltage K2 is shown at numeral 22 and the vertical component of voltage K2 is shown at numeral 23. Both components 22,23 are divided by two by the resistors 24 between the compensator 12 and the units 22 and 23. Hence, the voltages of the half the vertical and horizontal components of the compensation voltage K2 are sent to the compensator 12.

While compensation is being accomplished, all of the switches before the resistors are closed. When the compensation is brought to the compensation point 12 only the half compensation voltage is brought to this compensation point 12 by opening a pair of switches. The output 13 of the compensation point 12 than has the correct unbalance and this voltage is brought to the amplifier 14 and finally in the signal device or indicator 19.

Following the vector diagrams of FIGS. 1A and B and the electrical schematic of FIG. 2, in the first run when the rotating body is balanced the first time, a voltage 1 (FIG. 1B) is generated which represents the unbalance and the parameter E. Voltage 1 from the unbalance pick-up comes via line 7, device 8, line 9, compensator 12 to devices 14, 15, 16 and 17 and then to device 19 where point 1 is shown at this signal device. In order to bring this voltage point to the origin of the signal device, the appropriate switches are closed and potentiometers 20 and 21 are moved until point 1 is located at the origin. Then the potentiometers 20 and 21 represent the horizontal and vertical components of the compensation voltage K1. The potentiometers are locked at these positions. Now the second run when the rotor is rotated 180°, as described above, the unbalance voltage is brought to the signal device 19 in the same manner over the line 7, device 8, line 9, devices 12, 14, 15, 16, 17 and shown in the signal device 19. This unbalance voltage signal is point 1' of FIG. 1B, and in order to bring the voltage point 1' to the origin of the signal device 19, the potentiometers 22 and 23 are moved until the point 1' is in the origin, all appropriate switches being closed before. Now the potentiometers 22 and 23 represent the vertical and horizontal components of compensation voltage K2.

Next when one pair of connected switches associated with the potentiometers 22,23 is opened and the other pair closed, and the switches associated with the potentiometers 20,21 are opened, the signal device 19 shows a point outside of the origin. The distance between the original and this point is the true unbalance of the rotor.

What is claimed:

1. A process for adjusting a hard bearing balancing machine with respect to a particular rotor to be investigated on the machine consisting of the steps of obtaining a receiver signal which in addition to the unbalance value of the rotor contains a multiplication product which is independent of the unbalance of the rotor, one factor of the multiplication product being the eccentric distance between the rotor axis and rotational axis of the balancing machine, and another factor being the mass of the rotor under investigation, and prior to subsequent processing rendering inactive the mass of the rotor under investigation by the steps of multiplication of the receiver signal with the reciprocal value of the mass, elimination of the influence of eccentricity in the signal, and further multiplication of the signal free of the influence of eccentricity with the mass value of the rotor under investigation to thereby produce a signal representative of rotor unbalance.

2. A device for adjusting a hard bearing balancing machine with respect to a particular rotor to be investigated on the machine comprising an electrical circuit to which is sent receiver signals which in addition to the unbalanced value of the rotor contain a multiplication product which is independent of the unbalance of the rotor, the circuit including an initial amplification factor adjustable to the inverse proportion of the mass of the rotor under investigation, a compensation device to which the receiver signals are sent after modification by the initial amplification factor, the compensation device being constructed and arranged to eliminate the influence of the eccentricity in the receiver signals, and the circuitry further including another amplification factor where the compensated receiver signals free of the influence of eccentricity are adjusted through multiplication by the mass value of the rotor under investigation.

3. A device as in claim 2 in which the initial amplification factor is adjustable in steps.

* * * * *